US012789987B2

(12) United States Patent
Tomes et al.

(10) Patent No.: US 12,789,987 B2
(45) Date of Patent: Nov. 10, 2026

(54) ROTORCRAFT WITH ANTI-TORQUE AIR SYSTEM AND TAIL ROTOR(S)

(71) Applicant: Pratt & Whitney Canada Corp., Longueuil (CA)

(72) Inventors: Nathan Tomes, Hamilton (CA); Michel Bousquet, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/606,706

(22) Filed: Mar. 15, 2024

(65) Prior Publication Data

US 2025/0289567 A1 Sep. 18, 2025

(51) Int. Cl.
*B64C 27/82* (2006.01)

(52) U.S. Cl.
CPC ...... *B64C 27/82* (2013.01); *B64C 2027/8209* (2013.01); *B64C 2027/8227* (2013.01); *B64C 2027/8254* (2013.01); *B64C 2027/8272* (2013.01); *B64C 2027/8281* (2013.01)

(58) Field of Classification Search
CPC ........................ B64C 27/82; B64C 2027/8245
See application file for complete search history.

(56) References Cited

U.S. PATENT DOCUMENTS

| | | | | |
|---|---|---|---|---|
| 2,383,038 | A * | 8/1945 | Bossi | B64C 27/82 416/123 |
| 4,200,252 | A | 4/1980 | Logan | |
| 4,948,068 | A * | 8/1990 | VanHorn | B64C 27/82 244/17.19 |
| 5,240,205 | A * | 8/1993 | Allongue | B64C 27/82 244/17.19 |
| 6,352,220 | B1 * | 3/2002 | Banks | B64C 27/82 244/17.11 |
| 7,032,860 | B1 * | 4/2006 | Kirk | B64C 27/82 244/17.15 |
| RE42,446 | E * | 6/2011 | Kirk | B64C 27/006 244/17.15 |
| 8,196,855 | B2 * | 6/2012 | Balkus, Jr. | B64C 27/006 244/17.11 |
| 8,561,938 | B2 | 10/2013 | Dickman | |
| 8,636,246 | B2 | 1/2014 | Robertson | |
| 10,118,695 | B2 * | 11/2018 | Thomassin | B64C 27/82 |
| 10,633,086 | B2 | 4/2020 | Carr | |
| 11,718,394 | B2 * | 8/2023 | McNulty | B64C 27/82 244/17.19 |

(Continued)

OTHER PUBLICATIONS

JP_H06329096_A with English translation (Year: 1994).*

(Continued)

*Primary Examiner* — Joshua J Michener
*Assistant Examiner* — Michael B. Kreiner
(74) *Attorney, Agent, or Firm* — Getz Balich LLC

(57) ABSTRACT

An assembly is provided for a rotorcraft. This rotorcraft assembly includes a fuselage, a tail structure, an air system and a plurality of tail rotors. The tail structure is configured as or otherwise includes a tail boom. The tail boom projects longitudinally along a centerline out from the fuselage to a distal end. The air system includes an air flowpath. The air flowpath passes from the fuselage into the tail boom and extends longitudinally within the tail boom towards the distal end. The tail rotors are connected to the tail structure at the distal end.

13 Claims, 9 Drawing Sheets

(56) References Cited

U.S. PATENT DOCUMENTS

| | | | | |
|---|---|---|---|---|
| 2008/0093500 | A1 | 4/2008 | Smith | |
| 2011/0139924 | A1 | 6/2011 | Nakayama | |
| 2017/0267341 | A1 | 9/2017 | Thomassin | |
| 2018/0346135 | A1* | 12/2018 | Haldeman | B60L 53/12 |
| 2020/0198781 | A1* | 6/2020 | Haldeman | B64C 27/82 |
| 2022/0315212 | A1* | 10/2022 | Noiseux Boucher | B64C 27/82 |

OTHER PUBLICATIONS

DE_102019005141_A1 with English translation (Year: 2021).*

Sampatacos et al., "Notar: the Viable Alternative To a Tail Rotor", Hughes Helicopters, Inc., Culver City, CA, AIAA Aircraft Design, Systems and Technology Meeting, Oct. 17-19, 1983, AIAA-83-2527.

Joseph Trevithick, "Bell's Electrically-Powered Tail Rotor Tech Breaks Cover and It Could Be A Game Changer", Feb. 20, 2020, https://www.thedrive.com/the-war-zone/32304/bells-electrically-powered-tail-rotor-tech-breaks-cover-and-it-could-be-a-game-changer.

Leonardo Patents Multifan Anti-Torque System, Oct. 23, 2023, https://aviationweek.com/business-aviation/aircraft-propulsion/leonardo-patents-multifan-anti-torque-system.

EP search report for EP25164234.4 dated Jul. 23, 2025.

* cited by examiner

ROTORCRAFT WITH ANTI-TORQUE AIR SYSTEM AND TAIL ROTOR(S)

TECHNICAL FIELD

This disclosure relates generally to a rotorcraft and, more particularly, to anti-torque and/or yaw control for the rotorcraft.

BACKGROUND INFORMATION

A rotorcraft typically includes an anti-torque system for countering torque generated by a main rotorcraft rotor. Various types of anti-torque systems are known in the art. While these known anti-torque systems have various benefits, there is still room in the art for improvement.

SUMMARY

According to an aspect of the present disclosure, an assembly is provided for a rotorcraft. This rotorcraft assembly includes a fuselage, a tail structure, an air system and a plurality of tail rotors. The tail structure is configured as or otherwise includes a tail boom. The tail boom projects longitudinally along a centerline out from the fuselage to a distal end. The air system includes an air flowpath. The air flowpath passes from the fuselage into the tail boom and extends longitudinally within the tail boom towards the distal end. The tail rotors are connected to the tail structure at the distal end.

According to another aspect of the present disclosure, another assembly is provided for a rotorcraft. This rotorcraft assembly includes a fuselage, a tail structure, a Coanda effect anti-torque system, a plurality of tail rotors and a plurality of electric motors. The tail structure includes a tail boom and a vertical stabilizer. The tail boom projects longitudinally along a centerline out from the fuselage to a distal end. The vertical stabilizer is connected to the tail boom at the distal end. The Coanda effect anti-torque system is arranged with the tail structure. The tail rotors are connected to the vertical stabilizer. Each of the electric motors is configured to drive rotation of a respective one of the tail rotors.

According to still another aspect of the present disclosure, another assembly is provided for a rotorcraft. This rotorcraft assembly includes a fuselage, a tail boom and an air system. The tail boom projects longitudinally along a centerline out from the fuselage to a distal end. The tail boom includes a sidewall and a slot. The sidewall extends longitudinally along and circumferentially about the centerline. The slot extends longitudinally in the sidewall. The slot projects through the sidewall to fluidly couple an air flowpath to an environment external to the fuselage and the tail boom. The air system includes the air flowpath, a system vent and a flow diverter. The air flowpath passes from the fuselage into the tail boom with a downstream section of the air flowpath extending longitudinally within the tail boom towards the distal end. The system vent is fluidly coupled to the environment. The flow diverter is disposed in the fuselage and is configured to direct air from an upstream section of the air flowpath into: the downstream section of the air flowpath, while bypassing the system vent, during a first mode; and the system vent, while bypassing the downstream section of the air flowpath, during a second mode.

The Coanda effect anti-torque system may be operated to provide anti-torque control. The tail rotors may be rotated to provide yaw control.

The tail boom may include a sidewall that extends longitudinally along and circumferentially about the centerline. The Coanda effect anti-torque system may include a plurality of slots and a thruster. Each of the slots extends longitudinally in the sidewall. Each of the slots projects through the sidewall to fluidly couple the air flowpath to an environment external to the fuselage and the tail structure. The thruster is fluidly coupled with the air flowpath downstream of the plurality of slots. The thruster is configured to direct air received from the air flowpath laterally out of the tail structure into the environment.

The rotorcraft assembly may also include a plurality of electric motors. Each of the electric motors may be operatively coupled to a respective one of the tail rotors.

Each of the tail rotors may be configured as a ducted tail rotor.

Each of the tail rotors may be configured as an open tail rotor.

The tail structure may also include a stabilizer connected to the tail boom at the distal end. The tail rotors may be connected to the stabilizer.

The stabilizer may be a vertical stabilizer. Each of the tail rotors may be disposed in a respective duct extending laterally through the vertical stabilizer.

The tail structure may also include a tail rudder located longitudinally aft of the tail rotors.

The air system may be configured as an anti-torque system for the rotorcraft.

The tail boom may include a sidewall and a slot. The sidewall may extend longitudinally along the centerline and circumferentially about the air flowpath. The slot may extend longitudinally in the sidewall. The slot may project through the sidewall to fluidly couple the air flowpath to an environment external to the tail structure.

The tail structure may also include a thruster. The thruster may be configured to direct air received from the air flowpath laterally out of the tail structure into an environment external to the tail structure.

The thruster may be a fixed thruster.

The air system may also include a system vent and a flow regulator. The system vent may be fluidly coupled to the environment. The flow regulator may be disposed in the tail structure. The flow regulator may be configured to direct air from the air flowpath into: the thruster, while bypassing the system vent, during a first mode; and the system vent, while bypassing the thruster, during a second mode.

The flow regulator may also be configured to direct the air from the air flowpath into the thruster and the system vent during a third mode.

The air flowpath may include an upstream section and a downstream section. The air system may also include a system vent and a flow regulator. The system vent may be fluidly coupled to an environment external to the fuselage. The flow regulator may be disposed in the fuselage. The flow regulator may be configured to direct air from the upstream section into: the downstream section, while bypassing the system vent, during a first mode; and the system vent, while bypassing the downstream section, during a second mode.

The flow regulator may also be configured to direct the air from the upstream section into the downstream section and the system vent during a third mode.

The air system may also include an air mover configured to direct air within the air flowpath towards the tail structure.

The air mover may be configured as or otherwise include a fixed pitch fan rotor.

The air mover may be configured as or otherwise include a variable pitch fan rotor.

The rotorcraft assembly may also include an electric motor configured to drive operation of the air mover.

The rotorcraft assembly may also include an engine configured to drive operation of the air mover.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
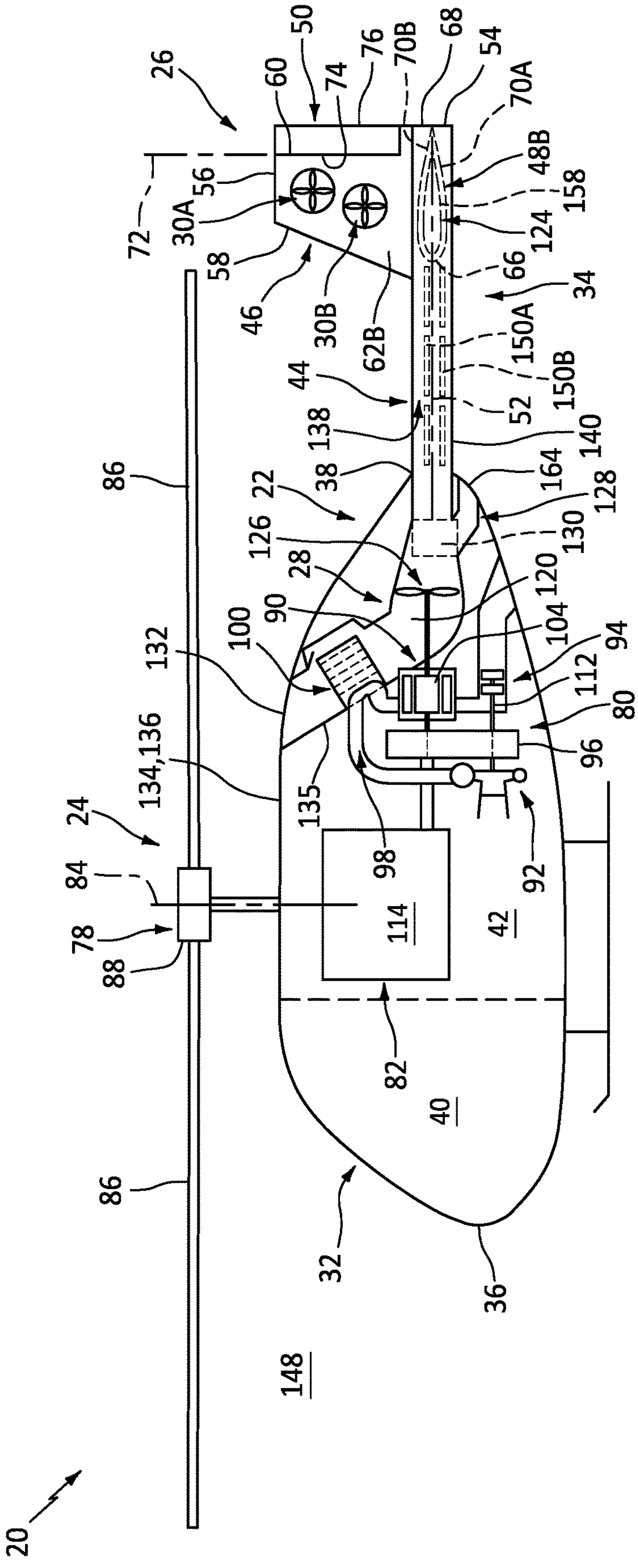
FIG. 1 is a schematic illustration of a rotorcraft.

FIG. 1 illustrates a rotorcraft 20 such as a helicopter or a drone; e.g., an unmanned aerial vehicle. This rotorcraft 20 includes a rotorcraft airframe 22, a rotorcraft lift system 24 and a rotorcraft flight control system 26. The flight control system 26 of FIG. 1 includes a rotorcraft air system 28 and one or more tail rotors 30A and 30B (generally referred to as "30"). As described below in further detail, the air system 28 of FIG. 1 is configured as or otherwise includes an anti-torque system (e.g., a Coanda effect anti-torque system) for the rotorcraft 20.

The airframe 22 of FIG. 1 includes a rotorcraft fuselage 32 and a rotorcraft tail structure 34. The fuselage 32 extends longitudinally from a forward nose end 36 of the fuselage 32 to an aft end 38 of the fuselage 32. Here, the fuselage nose end 36 is a forwardmost end of the airframe 22. The fuselage 32 of FIG. 1 includes one or more internal compartments such as a personnel cabin 40 (e.g., a cockpit, a passenger cabin, etc.) and a separate mechanical compartment 42 (e.g., an engine bay, etc.).

Figure 2:
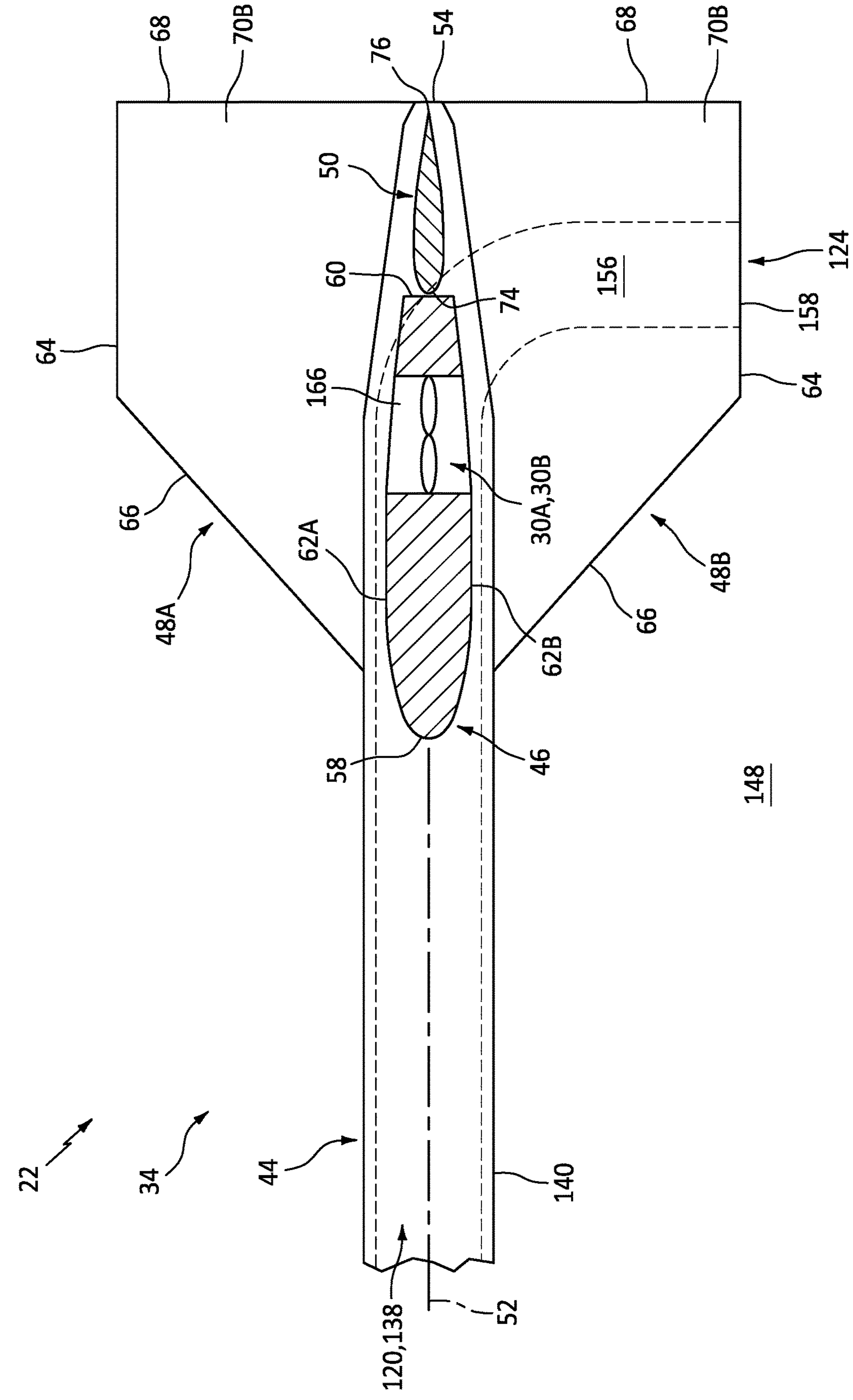
FIG. 2 is a partial schematic cutaway illustration of a tail structure of the rotorcraft.

The tail structure 34 of FIG. 1 includes a tail boom 44 and one or more stabilizers, such as a vertical stabilizer 46 and a plurality of horizontal stabilizers 48A and 48B (generally referred to as "48"); see also FIG. 2. The tail structure 34 may also include a tail rudder 50.

The tail boom 44 is connected to (e.g., attached to and cantilevered from) the fuselage 32 at the fuselage aft end 38. This tail boom 44 projects longitudinally out from the fuselage 32 along a longitudinal centerline 52 of the tail boom 44 to a distal tail end 54 of the tail structure 34 and its tail boom 44. Here, the tail end 54 is an aftmost end of the airframe 22 and, more generally, an aftmost end of the rotorcraft 20. This tail end 54 is horizontally opposite the fuselage nose end 36.

The vertical stabilizer 46 (e.g., a tail fin) is connected to the tail boom 44 at or otherwise towards the tail end 54. The vertical stabilizer 46 of FIG. 1, for example, projects vertically (e.g., spanwise) out from the tail boom 44 to a tip 56 (e.g., a distal top end) of the vertical stabilizer 46. The vertical stabilizer 46 extends longitudinally along a longitudinal mean line (e.g., a chord line) of the vertical stabilizer 46 from a leading edge 58 of the vertical stabilizer 46 to a trailing end 60 of the vertical stabilizer 46. Referring to FIG. 2, the vertical stabilizer 46 extends laterally (e.g., in a horizontal direction perpendicular to the centerline 52) between opposing lateral sides 62A and 62B (generally referred to as "62") of the vertical stabilizer 46. These vertical stabilizer sides 62 extend along the chord line and meet at the vertical stabilizer leading edge 58 and the vertical stabilizer trailing end 60. Referring to FIG. 1, each vertical stabilizer element 58, 60, 62A, 62B (side 62A not visible in FIG. 1) projects vertically out from the tail boom 44 to the vertical stabilizer tip 56.

Referring to FIG. 2, the horizontal stabilizers 48A and 48B are arranged to opposing lateral sides of the tail boom 44. These horizontal stabilizers 48 are connected to the tail boom 44 (or a base of the vertical stabilizer 46) at or otherwise towards the tail end 54. Each horizontal stabilizer 48 of FIG. 2 projects horizontally (e.g., spanwise) out from the tail boom 44 to a tip 64 (e.g., a distal end) of the respective horizontal stabilizer 48. Each horizontal stabilizer 48 extends longitudinally along a longitudinal mean line (e.g., a chord line) of the respective horizontal stabilizer 48 from a leading edge 66 of the respective horizontal stabilizer 48 to a trailing edge 68 of the respective horizontal stabilizer 48. Referring to FIG. 1, each horizontal stabilizer 48 extends laterally (e.g., in a vertical direction) between opposing lateral sides 70A and 70B (generally referred to as "70") of the respective horizontal stabilizer 48. These horizontal stabilizer sides 70 extend along the chord line and meet at the respective horizontal stabilizer leading edge 66 and the respective horizontal stabilizer trailing edge 68. Referring to FIG. 2, each horizontal stabilizer element 66, 68, 70A, 70B (sides 70A not visible in FIG. 1) projects horizontally out from the tail boom 44 to the respective horizontal stabilizer tip 64.

Referring to FIG. 1, the tail rudder 50 is disposed with the vertical stabilizer 46 at the tail end 54. The tail rudder 50 of FIG. 1, for example, is pivotally attached to the vertical stabilizer 46 through one or more pivot joints; e.g., hinges, pin connections, etc. The tail rudder 50 is thereby configured to pivot about a pivot axis 72 relative to the vertical stabilizer 46, which vertical stabilizer 46 is a stationary component of the rotorcraft 20 and its airframe 22. The pivot axis 72 of FIG. 1 may be parallel with or (e.g., slightly) angularly offset from the vertical stabilizer trailing end 60. A leading end 74 of the tail rudder 50 is disposed next to the vertical stabilizer trailing end 60. The tail rudder 50 projects longitudinally out from the rudder leading end 74 to a trailing edge 76 of the tail rudder 50. The tail rudder 50 may extend vertically along a portion or an entirety of a vertical extent of the vertical stabilizer 46.

The lift system 24 of FIG. 1 includes a bladed rotorcraft rotor 78 (e.g., an air mover such as a main helicopter rotor), a rotorcraft powerplant 80 and a drivetrain 82. The rotorcraft rotor 78 is rotatable about a rotational axis 84, which rotational axis 84 of FIG. 1 is angularly offset from the centerline 52 by an included offset angle. This offset angle may be between eighty degrees (80°) and one-hundred degrees (100°); e.g., about ninety degrees (90°). The rotorcraft rotor 78 of FIG. 1 includes a plurality of rotor blades 86 and a rotor base 88; e.g., a hub or a disk. The rotor blades 86 are arranged circumferentially about the rotor base 88 and the rotational axis 84 in an array. Each of the rotor blades 86 is connected to and projects radially out from (relative to the rotational axis 84) the rotor base 88. The rotorcraft rotor 78 of FIG. 1 is located vertically above the fuselage 32. Moreover, the rotorcraft rotor 78 is spaced vertically out from the fuselage 32 and, more generally, the airframe 22. Here, the rotorcraft rotor 78 is an unshrouded rotor. The present disclosure, however, is not limited to such an exemplary rotorcraft rotor location or configuration.

Figure 3:
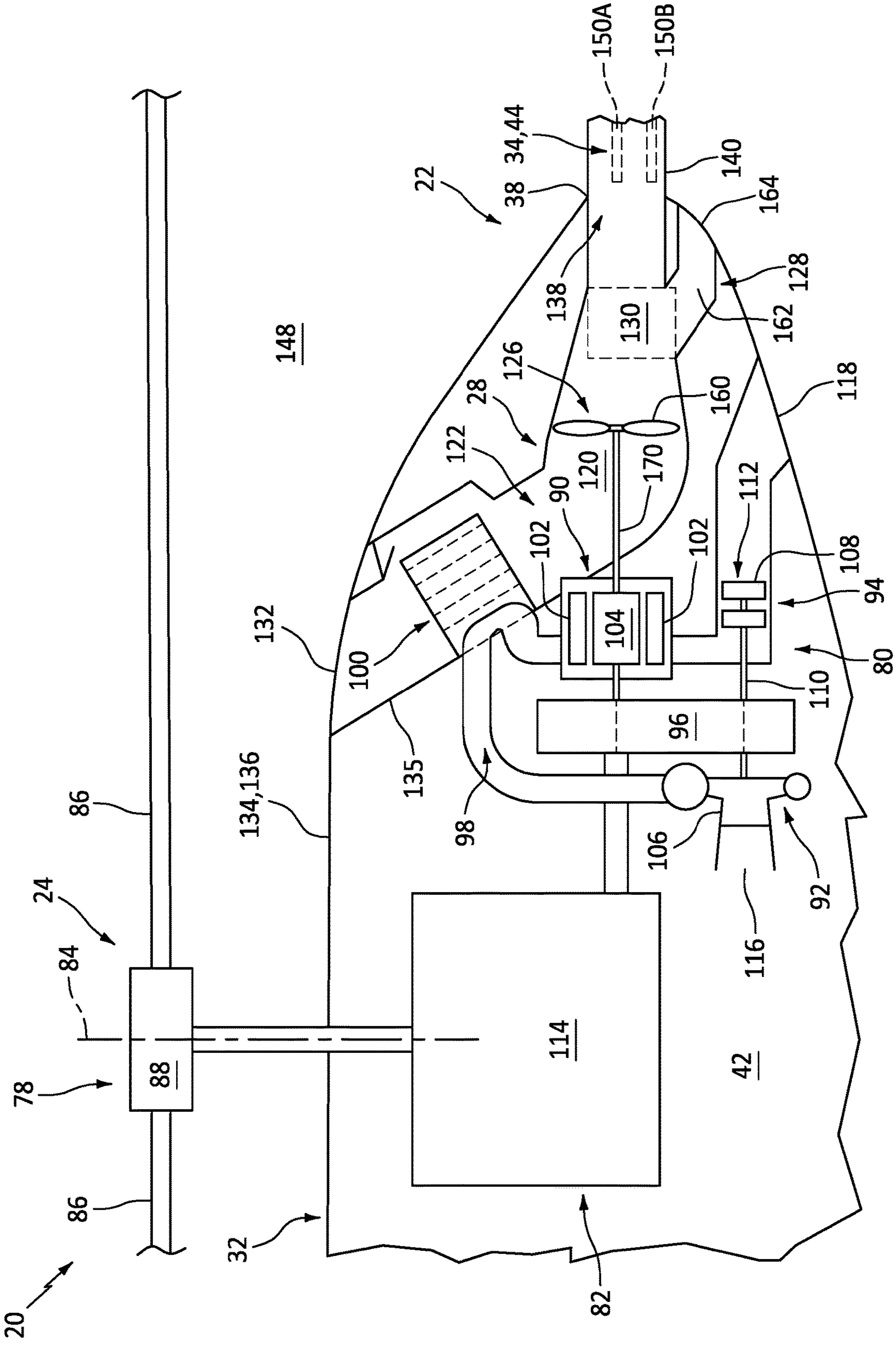
FIG. 3 is a partial schematic illustration of the rotorcraft at its powerplant.

Referring to FIG. 3, the rotorcraft powerplant 80 may be configured as or otherwise include a turbo-compounded engine system. The rotorcraft powerplant 80 of FIG. 3, for example, includes a heat engine 90, a compressor section 92, a turbine section 94 and a transmission 96; e.g., a gear system, a speed change device and/or a variable speed transmission. The rotorcraft powerplant 80 of FIG. 3 also includes a powerplant flowpath 98 (e.g., a core flowpath) and a powerplant heat exchanger 100.

The heat engine 90 may be an intermittent combustion internal combustion (IC) engine. Examples of this intermittent combustion internal combustion engine include, but not limited to, a rotary engine (e.g., a Wankel cycle engine) and a reciprocating piston engine (e.g., an inline (I) engine, a V-engine or a W-engine). Alternatively, the heat engine 90 may be a continuous combustion internal combustion (IC) engine. An example of the continuous combustion internal combustion engine is a gas turbine engine such as a turboshaft engine. However, for ease of description, the heat engine 90 may be generally described below as the rotary engine. The heat engine 90 of FIG. 3 is configured to detonate (e.g., combust) a mixture of fuel and air within one or more combustion zones 102. Each combustion zone may be configured as or otherwise include a combustion chamber (or a piston bore and/or the like) within the heat engine 90. The detonation of the fuel-air mixture within the combustion zones 102 drives rotation of an internal engine rotating assembly 104 of the heat engine 90. This engine rotating assembly 104 may include one or more rotors (or pistons) in and/or along the combustion zones 102, and is rotatable about an engine axis.

The compressor section 92 includes a bladed compressor rotor 106. This compressor rotor 106 may be configured as a radial flow compressor rotor; e.g., an axial inflow-radial outflow compressor rotor, a centrifugal compressor rotor, a compressor impeller, etc. Alternatively, the compressor rotor 106 may be configured as an axial flow compressor rotor; e.g., an axial inflow-axial outflow compressor rotor. The compressor rotor 106 of FIG. 3 includes a compressor rotor base (e.g., a disk or a hub) and a plurality of compressor rotor blades (e.g., airfoils, vanes, etc.). The compressor rotor blades are arranged circumferentially around the compressor rotor base in an array. Each of the compressor rotor blades is connected to and projects radially out from the compressor rotor base. The compressor rotor 106 is rotatable about a compressor axis.

The turbine section 94 includes a bladed turbine rotor 108. This turbine rotor 108 may be configured as an axial flow turbine rotor; e.g., an axial inflow-axial outflow turbine rotor. Alternatively, the turbine rotor 108 may be configured as a radial flow turbine rotor; e.g., a radial inflow-axial outflow turbine rotor, a centrifugal turbine rotor, a turbine wheel, etc. The turbine rotor 108 of FIG. 3 includes a turbine rotor base (e.g., a disk or a hub) and a plurality of turbine rotor blades (e.g., airfoils, vanes, etc.). The turbine rotor blades are arranged circumferentially around the turbine rotor base in an array. Each of the turbine rotor blades is connected to and projects radially out from the turbine rotor base. The turbine rotor 108 is rotatable about a turbine axis, which turbine axis may be parallel (e.g., coaxial) with the compressor axis.

The turbine rotor 108 may be coupled to the compressor rotor 106 directly through a turbo-compressor shaft 110 or indirectly through the transmission 96. At least (or only) the compressor rotor 106, the turbine rotor 108 and the turbo-compressor shaft 110 may collectively form a turbo-compressor rotating assembly 112; e.g., a spool. This turbo-compressor rotating assembly 112 and its turbine rotor 108 are operatively coupled to and rotatable with the engine rotating assembly 104 through the transmission 96. The turbo-compressor rotating assembly 112 may thereby rotate at a different rotational velocity than the engine rotating assembly 104. The engine rotating assembly 104 is also operatively coupled to and rotatable with the rotorcraft rotor 78 through the drivetrain 82, and the transmission 96 in the exemplary arrangement of FIG. 3. The drivetrain 82 of FIG. 3 includes a geartrain 114 (e.g., a speed change device, a variable speed transmission, etc.) operatively coupling the engine rotating assembly 104/the transmission 96 to the rotorcraft rotor 78. The engine rotating assembly 104 may thereby rotate at a different rotational velocity than the rotorcraft rotor 78.

The powerplant flowpath 98 extends between an airflow inlet 116 into the powerplant flowpath 98 and a combustion products exhaust 118 from the powerplant flowpath 98. The flowpath inlet 116 may also be an airflow inlet into the rotorcraft powerplant 80. The flowpath exhaust 118 may also be a combustion products exhaust from the rotorcraft powerplant 80. Within the rotorcraft powerplant 80, the powerplant flowpath 98 of FIG. 3 extends (e.g., sequentially) through the compressor section 92 (e.g., across the compressor rotor 106), the powerplant heat exchanger 100, the heat engine 90 (e.g., along/across the rotors (or pistons) of the engine rotating assembly 104) and the turbine section 94 (e.g., across the turbine rotor 108) from the flowpath inlet 116 to the flowpath exhaust 118.

During operation of the rotorcraft powerplant 80, fuel is injected into the combustion zones 102. The fuel is mixed with compressed air within the combustion zones 102. This fuel-air mixture is ignited, and combustion products generated therefrom drive rotation of the engine rotating assembly 104. The rotation of the engine rotating assembly 104 drives rotation of the rotorcraft rotor 78 through the drivetrain 82, and the rotating rotorcraft rotor 78 generates aircraft lift (and aircraft thrust). The combustion products further flow out of the heat engine 90 into the turbine section 94 and drive rotation of the turbine rotor 108. The rotation of the turbine rotor 108 drives rotation of the compressor rotor 106, and the rotating compressor rotor 106 compresses air entering the rotorcraft powerplant 80 and its powerplant flowpath 98 through the flowpath inlet 116 to provide the compressed air to the heat engine 90. The rotation of the turbine rotor 108 also drives rotation of (e.g., boosts mechanical power to) the engine rotating assembly 104 through the transmission 96. The rotation of the turbine rotor 108 may thereby also drive rotation of (e.g., boost mechanical power to) the rotorcraft rotor 78 through the transmission 96 and the drivetrain 82.

The powerplant heat exchanger 100 may be configured as an intercooler for the rotorcraft powerplant 80. This powerplant heat exchanger 100 is arranged with an air flowpath 120 of the air system 28. The powerplant heat exchanger 100 of FIG. 3, for example, is disposed within an upstream section 122 of the air flowpath 120 extending in the fuselage 32. With this arrangement, the powerplant heat exchanger 100 is configured to transfer heat energy from (A) the relatively warm compressed air directed through the powerplant flowpath 98 from the compressor section 92 towards the heat engine 90 into (B) relatively cool air system air ("system air") directed through the air flowpath 120 as described below in further detail. The powerplant heat exchanger 100 may thereby cool the compressed air for delivery to the heat engine 90. This pre-cooling of the compressed air delivered to the heat engine 90 may facilitate increased heat engine efficiency.

As indicated above, the air system 28 of FIG. 1 is configured as or otherwise includes an anti-torque system for the rotorcraft 20 which may replace a traditional anti-torque tail rotor. This air system 28 includes the air flowpath 120, a tail thruster 124 and an air mover 126. The air system 28 of FIG. 1 also includes an air system vent 128 and a flow regulator 130.

The air flowpath 120 extends within the airframe 22 from an airflow inlet 132 into the air flowpath 120 to the tail thruster 124. The flowpath inlet 116 may be arranged with the fuselage 32. The flowpath inlet 116 of FIG. 1, for example, is formed in an exterior wall 134 of the fuselage 32 at a vertical top side 136 of the fuselage 32 and vertically beneath the rotorcraft rotor 78. Of course, various other flowpath inlet locations are feasible and contemplated by the present disclosure.

The upstream section 122 of the air flowpath 120 is formed within the fuselage 32. The upstream section 122 of the air flowpath 120, for example, may be at least partially (or completely) formed by an air duct 135 disposed within the fuselage 32. This air duct 135 may extend from (and form) the flowpath inlet 116 to a downstream section 138 of the air flowpath 120.

The downstream section 138 of the air flowpath 120 may be configured as or otherwise include an interior volume (e.g., a bore, a channel, a passage, etc.) extending longitudinally within the tail boom 44. The downstream section 138 of the air flowpath 120 of FIG. 1, for example, is formed within the tail boom 44. This downstream section 138 of the air flowpath 120 may be at least partially (or completely) formed by an exterior sidewall 140 of the tail boom 44.

Figure 4:
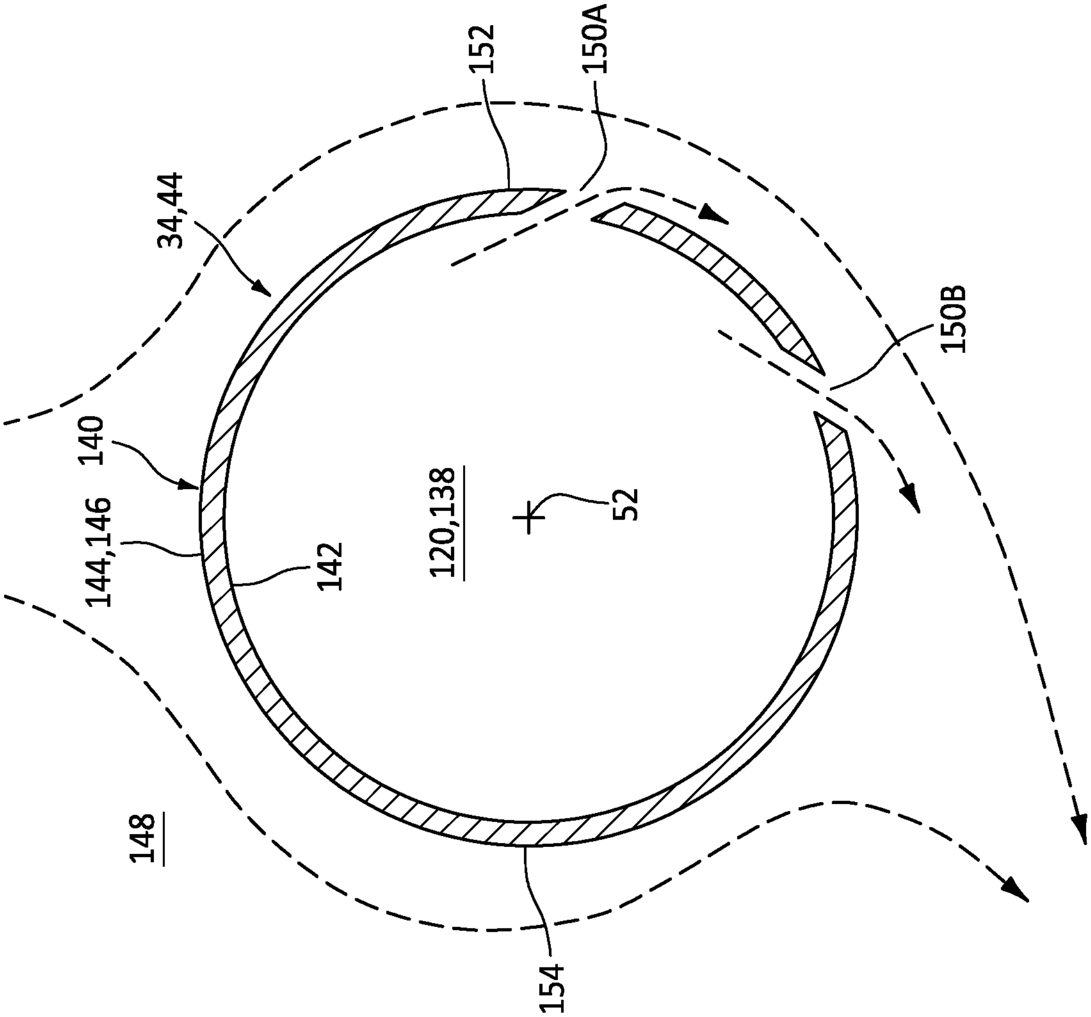
FIG. 4 is a schematic cross-sectional illustration of a tail boom of the rotorcraft.

The boom sidewall 140 projects longitudinally along the centerline 52 out from the fuselage 32 towards a longitudinal distal end of the boom sidewall 140 proximate the tail end 54. Referring to FIG. 4, the boom sidewall 140 extends radially (relative to the centerline 52) between a radial inner side 142 of the boom sidewall 140 and a radial outer side 144 of the boom sidewall 140. The sidewall inner side 142 may at least partially (or completely) form a radial outer peripheral boundary of the air flowpath 120 (e.g., the interior volume) within the boom sidewall 140; e.g., from the fuselage 32 to the tail thruster 124 of FIG. 1. The sidewall outer side 144 may form an exterior surface 146 of the boom sidewall 140 exposed to an environment 148 external to the tail boom 44 and, more generally, the rotorcraft 20 of FIG. 1. The boom sidewall 140 of FIG. 4 extends circumferentially about (e.g., completely around) the centerline 52 providing the boom sidewall 140 with a full-hoop (e.g., tubular) geometry.

Figure 5:
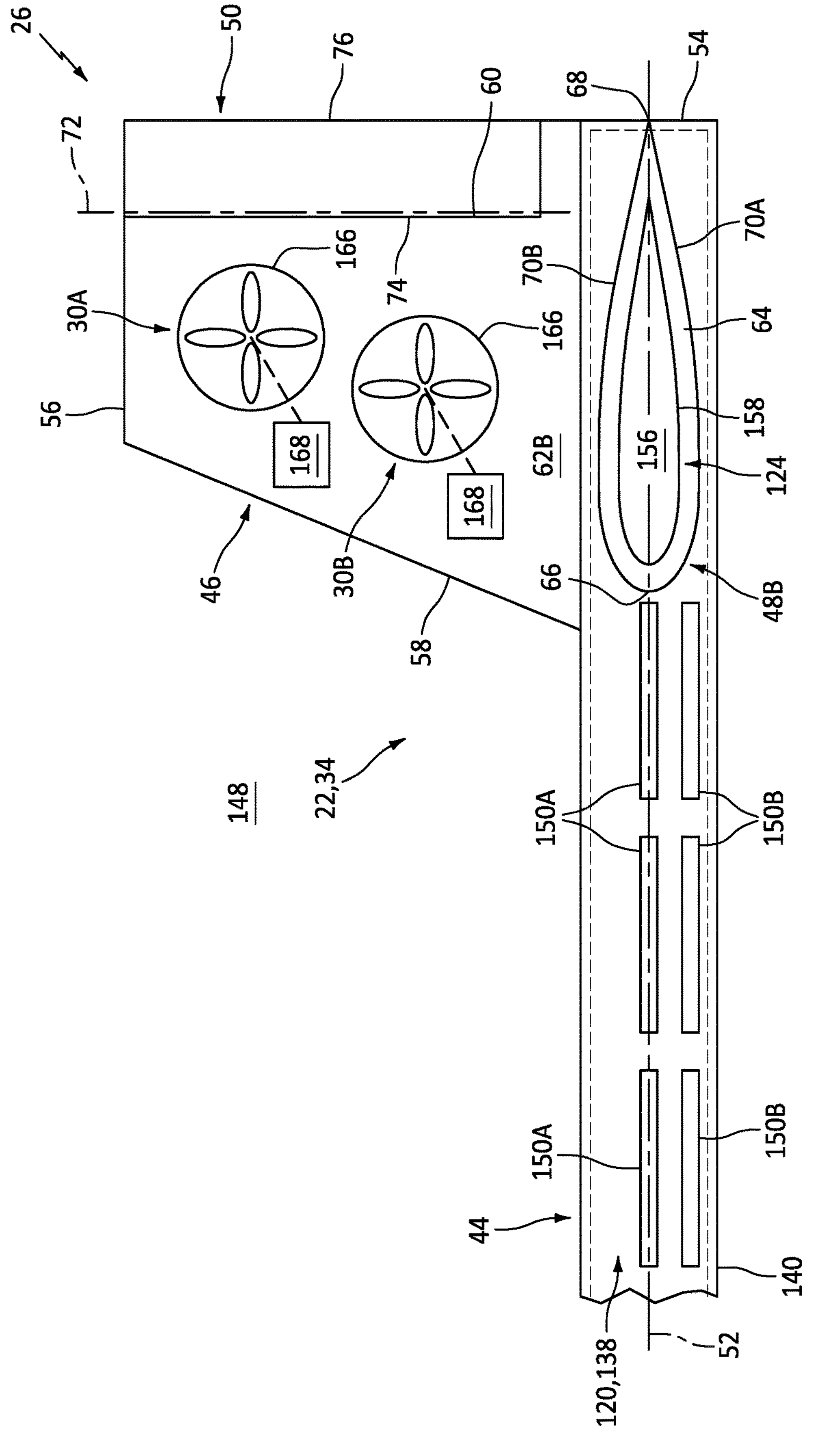
FIG. 5 is a side illustration of the tail boom depicted with various internal features in dashed line form.

Referring to FIG. 5, the boom sidewall 140 also includes one or more slots 150A and 150B (generally referred to as "150"); e.g., intermediate outlets from the air flowpath 120. These slots 150 may be arranged into one or more longitudinally extending arrays, where the top array of slots 150A is located vertically above the bottom array of slots 150B circumferentially along the tail boom 44 and its boom sidewall 140. Referring to FIG. 1, each slot 150 array may extend longitudinally along the tail boom 44 and its boom sidewall 140 from (or about) the fuselage 32 to (or about) a point generally aligned with an outer periphery of the rotorcraft rotor 78.

Each of the slots 150 of FIG. 5 extends longitudinally within the boom sidewall 140 along the centerline 52. Referring to FIG. 4, the slots 150 are disposed to a common (the same) first lateral side 152 of the tail boom 44 and its boom sidewall 140; e.g., a starboard side/right side. Thus, an opposing second lateral side 154 of the tail boom 44 and its boom sidewall 140 (e.g., a port side/left side) may be configured without any slots (or other similar apertures) fluidly coupling the air flowpath 120 to the external environment 148. Each of the slots 150 of FIG. 4 projects through the boom sidewall 140 along a trajectory of the respective slot 150 from the air flowpath 120 (e.g., the interior volume) to the external environment 148. This slot trajectory may point generally vertically downward. Each slot trajectory may also be angularly offset from a reference plane tangent to the exterior surface 146 (e.g., at a point where the slot 150 pierces the exterior surface 146) by an included offset angle. This offset angle may be an acute angle between, for example, five degrees (5°) and thirty degrees (30°). With this arrangement, the slots 150 fluidly couple the air flowpath 120 and its downstream section 138 to the external environment 148 and are operable to direct system gas out from the air flowpath 120 into the external environment 148 generally downward and along the exterior surface 146.

Referring to FIG. 5, the tail thruster 124 may be configured as a fixed area and/or a fixed position tail thruster. The tail thruster 124 of FIG. 2, for example, includes a thruster flowpath 156 and a thruster outlet 158. The thruster flowpath 156 may be configured as an extension (e.g., an uninterrupted extension) of the air flowpath 120 out of the tail boom 44 to the thruster outlet 158. This thruster flowpath 156 of FIG. 2, for example, projects out from the air flowpath 120 and its downstream section 138 within the tail boom 44 and turns (e.g., curves) into the second horizontal stabilizer 48B. The thruster flowpath 156 extends laterally through the second horizontal stabilizer 48B to the thruster outlet 158, where the thruster outlet 158 of FIG. 2 is disposed at the horizontal stabilizer tip 64. At least adjacent the thruster outlet 158, the thruster flowpath 156 extends along a trajectory that is angularly offset from the centerline 52 by an offset angle and may be in a horizontal plane. The offset angle may be a right angle (90°). Alternatively, the offset angle may be an acute angle greater than eighty degrees (80°) (e.g., slightly angled forward) or an obtuse angle less than one-hundred and ten degrees (110°) (e.g., slightly angled aft). With the arrangement of FIG. 2, the tail thruster 124 may direct the system air out of the tail structure 34 into the external environment 148 through the thruster outlet 158 in a substantially or completely horizontal direction as described below in further detail.

Referring to FIG. 3, the air mover 126 is disposed within the air flowpath 120. The air mover 126 of FIG. 3 is located within the upstream section 122 of the air flowpath 120 at a location downstream of the powerplant heat exchanger 100. The air mover 126, however, may alternatively be located within the upstream section 122 of the air flowpath 120 at a location upstream of the powerplant heat exchanger 100.

The air mover 126 may be configured as a fan rotor 160. This fan rotor 160 includes a fan rotor base (e.g., a disk or a hub) and a plurality of fan rotor blades (e.g., airfoils, vanes, etc.). The fan rotor blades are arranged circumferentially around the fan rotor base in an array. Each of the fan rotor blades is fixedly connected to and projects radially out from the fan rotor base. With this arrangement, the fan rotor 160 is configured as a fixed pitch fan rotor which reduces air system complexity. It is contemplated, however, the fan rotor 160 may alternatively be configured as a variable pitch fan rotor to provide additional air mover output flow control. The fan rotor blades, for example, may be pivotally coupled to the fan rotor base.

The system vent 128 of FIG. 3 is disposed in the fuselage 32. This system vent 128 includes a vent flowpath 162 and a vent outlet 164. The vent flowpath 162 extends within the fuselage 32 from the flow regulator 130 (or the air flowpath 120) to the vent outlet 164, where the vent outlet 164 of FIG. 3 is disposed at the fuselage aft end 38 and vertically below the tail structure 34 and its tail boom 44. At least adjacent the vent outlet 164, the vent flowpath 162 extends along a trajectory that may be parallel with or slightly offset from the centerline 52. With the arrangement of FIG. 3, the system vent 128 may direct any of the system air received from the air flowpath 120 into the external environment 148 through the vent outlet 164 in a substantially or completely aft, horizontal direction as described below in further detail.

Figure 6A:
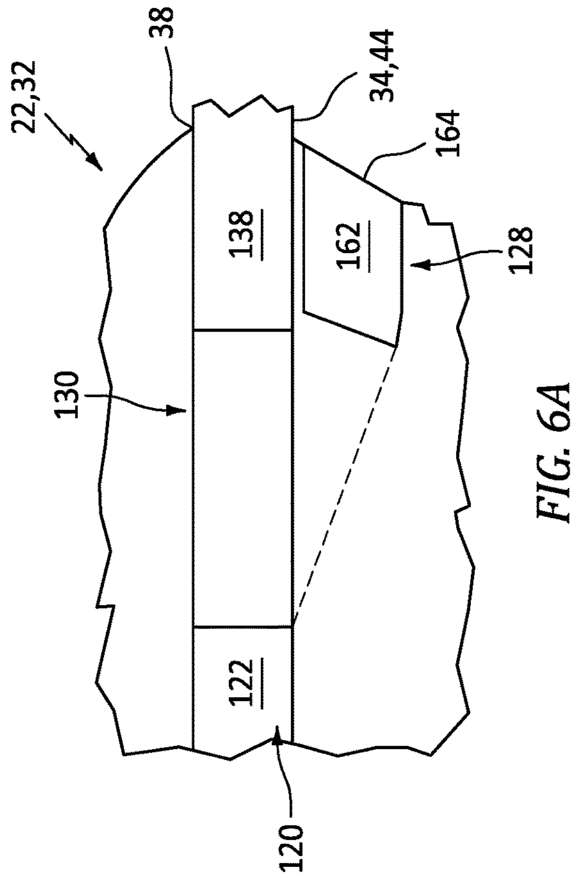
FIGS. 6A-C are partial schematic illustrations of a flow regulator between an air flowpath and a system vent in various flow arrangements.
Figure 6B:
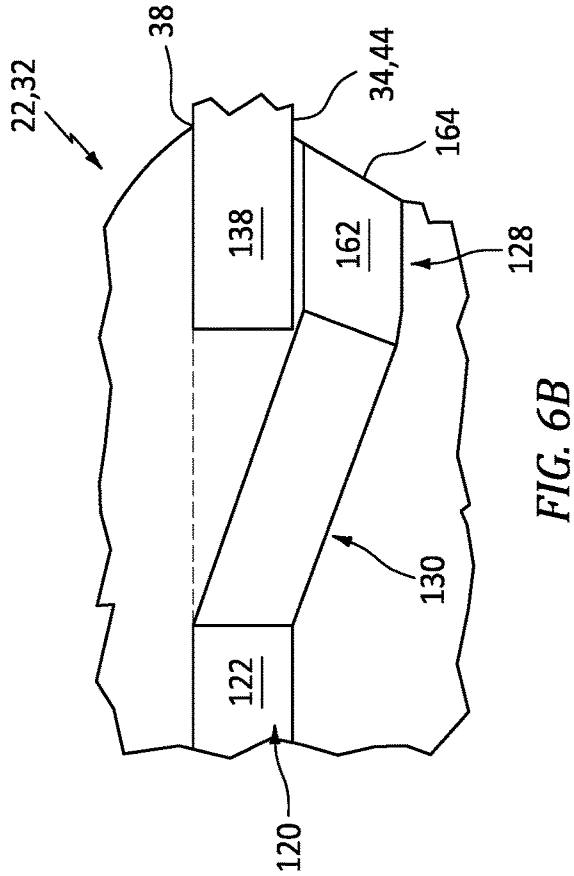
Figure 6C:
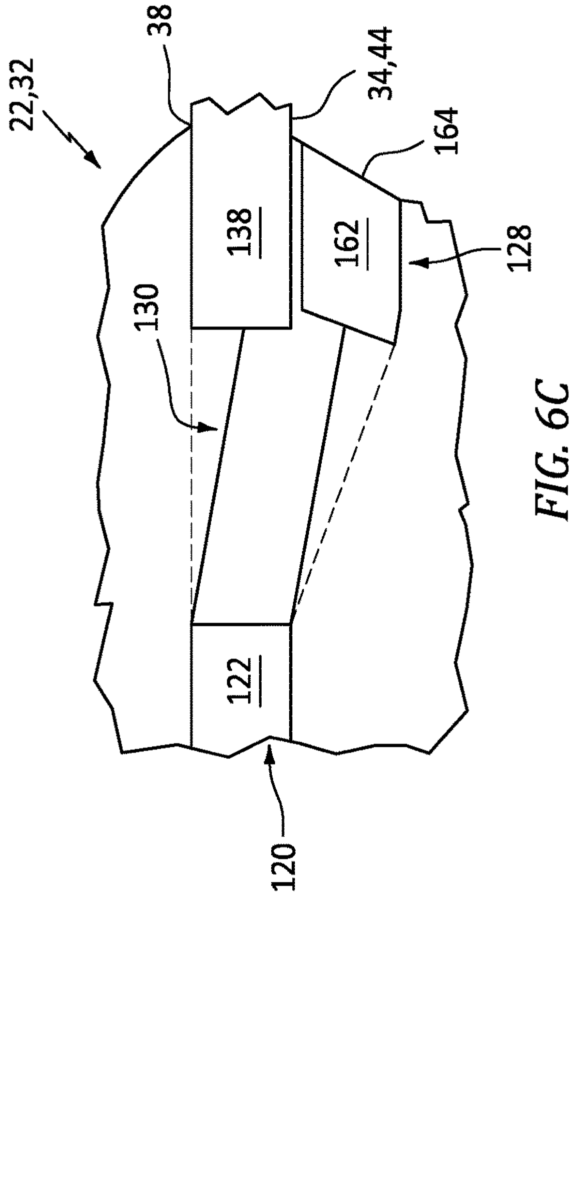

Referring to FIGS. 6A-C, the flow regulator 130 is configured to control air flow from the upstream section 122 of the air flowpath 120 selectively to (a) the downstream section 138 of the air flowpath 120 and/or (b) the system vent 128 and its vent flowpath 162. The flow regulator 130 of FIGS. 6A-C, for example, is configured as a flow diverter such as, but not limited to, a gimbal duct.

Referring to FIG. 5, the tail rotors 30 are arranged with the tail structure 34 at the tail end 54. The tail rotors 30 of FIG. 5, for example, are arranged with and connected to the vertical stabilizer 46. The first tail rotor 30A may be disposed vertically above and longitudinally offset aft from the second tail rotor 30B. The first tail rotor 30A may therefore be referred to as a top tail rotor and/or an aft tail rotor. The second tail rotor 30B, by contrast, may be disposed vertically below and longitudinally offset forward from the first tail rotor 30A. The second tail rotor 30B may therefore be referred to as a bottom tail rotor and/or a forward tail rotor. The present disclosure, however, is not limited to such an exemplary arrangement. The tail rotors 30, for example, may alternatively be longitudinally aligned in a vertically extending array between the tail boom 44 and the vertical stabilizer tip 56. In another example, the tail rotors 30 may be aligned longitudinally side-by-side in a horizontally extending array between the vertical stabilizer leading edge 58 and the vertical stabilizer trailing end 60. Moreover, while the tail structure 34 and its vertical stabilizer 46 of FIG. 5 are shown with two of the tail rotors 30, it is contemplated one or more additional tail rotors may also be included.

Figure 7:
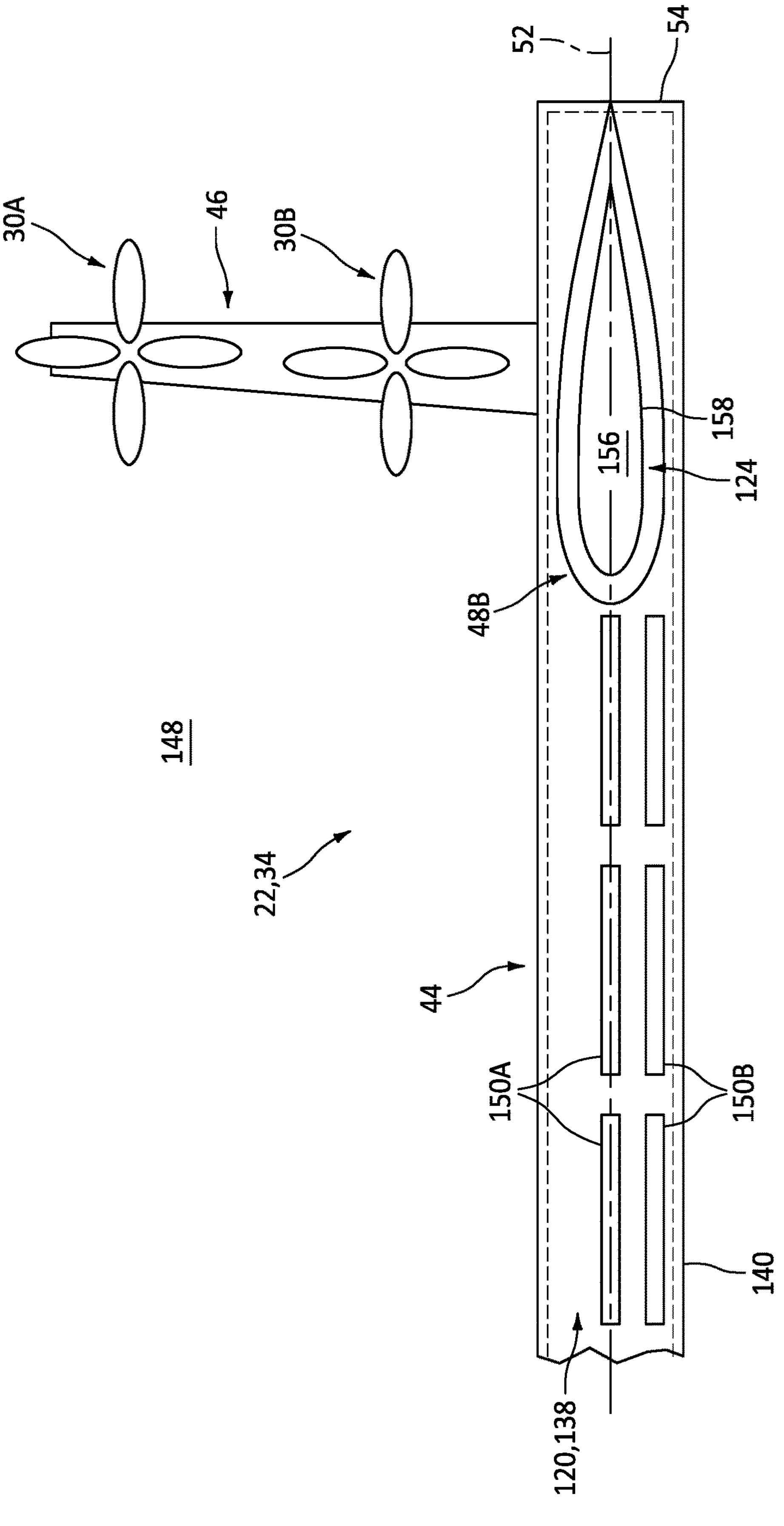
FIG. 7 is a side illustration of another tail boom arrangement depicted with various internal features in dashed line form.

Each tail rotor 30 may be configured as a ducted tail rotor. Each tail rotor of FIG. 5, for example, is disposed in a respective tail rotor duct 166. Referring to FIG. 2, each tail rotor duct 166 extends laterally through the vertical stabilizer 46 between the opposing lateral vertical stabilizer sides 62. Configuring these tail rotors 30 into the vertical stabilizer 46 may reduce aerodynamic drag during forward rotorcraft flight. Moreover, ducted rotors typically facilitate quieter operation than open rotors. It is contemplated, however, the tail rotors 30 may alternatively be configured as open tail rotors (e.g., un-ducted tail rotors) as shown, for example, in FIG. 7.

Each tail rotor 30 of FIG. 5 is paired with a respective electric motor 168 (schematically shown). This electric motor 168 is operatively coupled to the respective tail rotor 30. The electric motor 168 is configured to drive rotation of the respective tail rotor 30 about its rotational axis. The electric motor 168 may be configured as a variable speed electric motor. Moreover, the electric motor 168 may be configured as a variable direction electric motor. The electric motor 168, for example, may selectively drive rotation of the respective tail rotor 30 in a first (e.g., clockwise or counterclockwise) direction about its rotational axis or a second (e.g., counterclockwise or clockwise) direction about its rotational axis. The present disclosure, however, is not limited to such an exemplary electric motor. The electric motor 168 paired with each tail rotor 30, for example, may alternatively be configured to drive rotation of the respective tail rotor 30 a single direction about its rotational axis.

Referring to FIG. 1, during rotorcraft hover, ambient air flows into the air flowpath 120 through the flowpath inlet 132. This ambient air may be directed into the air flowpath 120 by thrust (e.g., main rotor wash, downwash) generated by the rotation of the rotorcraft rotor 78 and/or suction generated by rotation of the air mover 126. Within the air flowpath 120, the ambient air-now referred to as the system air—is directed through the powerplant heat exchanger 100 to cool the compressed air in the powerplant flowpath 98 as described above. The system air is subsequently directed by the air mover 126 into the downstream section 138 of the air flowpath 120 and the tail boom 44.

As the system air flows through the tail boom 44, a portion (e.g., about 30-70%) of the system air is exhausted from the air flowpath 120 into the external environment 148 through the slots 150. Referring to FIG. 4, this exhausted system air may interact with rotor wash from the rotorcraft rotor 78 to turn the rotor wash flowing around the tail boom 44 to the second lateral side of the tail boom 44; e.g., where the rotorcraft rotor 78 is rotating counterclockwise when looking vertically down onto a vertical top of the rotorcraft 20 (see FIG. 1). By turning/redirecting the rotor wash towards the second lateral side 154 of the tail boom 44, the air system 28 is operable to utilize this redirected rotor wash to provide lateral thrust to counteract rotational torque imparted onto the airframe 22 by the rotation of the rotorcraft rotor 78. Referring to FIG. 2, additional lateral thrust to counteract rotational torque imparted onto the airframe 22 by the rotation of the rotorcraft rotor 78 is provided by the tail thruster 124. In particular, another portion (e.g., about 70-30%) of the system air is exhausted from the air flowpath 120 into the external environment 148 by the tail thruster 124 and through its thruster outlet 158. The air system 28 of FIG. 1 is thereby configured as the anti-rotation system for the rotorcraft 20. In other embodiments, however, it is contemplated the air system 28 may be configured without the slots 150 or the tail thruster 124. Where the slots 150 are omitted, the tail thruster 124 may receive 0-100% of the system air. Where the tail thruster 124 is omitted, the slots 150 may receive 0-100% of the system air.

In general, referring to FIG. 1, the lateral thrust facilitated by exhausting the system air through the slots 150 and the lateral thrust facilitated by exhausting the system air through the thruster outlet 158 may be tailored to maintain an orientation of the rotorcraft 20 during hover; e.g., assuming little or no cross wind within the external environment 148. One or both of the tail rotors 30A, 30B therefore may be selectively operated to provide fine-tuned yaw control. For example, one or both of the tail rotors 30A, 30B may be rotated in the first direction to facilitate rotorcraft yaw in one direction during hover. By contrast, one or both of the tail rotors 30A, 30B may be rotated in the second direction to facilitate rotorcraft yaw in an opposite direction during hover. Alternatively, it is contemplated the lateral thrust associated with the slots 150 and the tail thruster 124 may be tailored to account for a certain amount of lateral thrust (e.g., 10-50% of total anti-rotation thrust) provided by the tail rotors 30. This thrust provided by the tail rotors 30 may then be increased or decreased to provide the fine-tuned yaw control. Notably, by utilizing the electric motor powered tail rotors 30 for fine-tuned yaw control, the flow regulator 130 may be configured with a simple, robust design for reliable operation rather than being designed for rapid response operation as would be needed if the flow regulator 130 was also used to provide primary yaw control.

During rotorcraft forward flight (e.g., cruise), the flow regulator 130 of FIG. 3 may be actuated to divert some or all of the system air away from the downstream section 138 of the air flowpath 120 and into the system vent 128. The slots 150 and the tail thruster 124 therefore may receive little or no system air. Rather, the system air is directed by the air mover 126 through the vent flowpath 162 and into the external environment 148 through the vent outlet 164. Since the system air is exhausted in an aft horizontal direction out of the system vent 128, this exhausted system air may add to the forward thrust of the rotorcraft 20. Moreover, the rotorcraft 20 may be moving forward fast enough through the external environment 148 that the movement of the vertical stabilizer 46 through the ambient air may be sufficient to counteract the torque of the rotorcraft rotor 78. During this forward flight, the tail rudder 50 may be pivoted to (e.g., completely) control the rotorcraft yaw. Note also, by diverting the system air away from the downstream section 138 of the air flowpath 120, the tail rudder 50 need not be adjusted to account for (e.g., counteract) lateral thrust that would otherwise be associated with the slots 150 and/or the tail thruster 124.

In addition to facilitating anti-rotation and yaw control during rotorcraft hover, the flight control system 26 may also provide the rotorcraft 20 with multiple redundant modes of operation. For example, the flight control system 26 may be operated in various modes of operation during rotorcraft hover. During a normal mode of operation, the flight control system 26 may be operated as described above. However, in an unlikely event the flow controller malfunctions, the flight control system 26 may operate in a backup mode of operation. For example, where the flow regulator 130 continues to direct the system air into the system vent 128 (e.g., see FIG. 6B) during rotorcraft hover, the tail rotors 30 may be operated (e.g., turned on, sped up, etc.) to generate additional lateral thrust to replace any lateral thrust that otherwise would have been provided by the system air flowing through the slots 150 and/or the tail thruster 124. In other words, one or both of the tail rotors 30A, 30B and their electric motor(s) 168 may be configured (e.g., sized, etc.) to provide all anti-rotation when needed. In another example, in an unlikely event where the electric motor 168 paired with the first tail rotor 30A malfunctions (or something malfunctions with the first tail rotor 30A itself), the flight control system 26 may operate in another backup mode of operation. The second tail rotor 30B, for example, may be operated (e.g., turned on, sped up, etc.) to generate additional lateral thrust to replace any lateral thrust that otherwise would have been provided by the first tail rotor 30A; e.g., for the fine-tuned yaw control. In other words, the second tail rotor 30B and its electric motor 168 may be configured (e.g., sized, etc.) to operate without the first tail rotor 30A. In still another example, in an unlikely event where the electric motor 168 paired with the second tail rotor 30B malfunctions (or something malfunctions with the second tail rotor 30B itself), the flight control system 26 may operate in another backup mode of operation. The first tail rotor 30A, for example, may be operated (e.g., turned on, sped up, etc.) to generate additional lateral thrust to replace any lateral thrust that otherwise would have been provided by the second tail rotor 30B; e.g., for the fine-tuned yaw control. In other words, the first tail rotor 30A and its electric motor 168 may be configured (e.g., sized, etc.) to operate without the second tail rotor 30B.

The flow regulator 130 of FIG. 6A is described above as directing (e.g., all) of the system air into the downstream section 138 of the air flowpath 120 during rotorcraft hovering. The flow regulator 130 of FIG. 6B is described above as directing (e.g., all) of the system air into the system vent 128 during rotorcraft forward flight. It is contemplated, however, the flow regulator 130 may also move to an intermediate position during rotorcraft hovering, during rotorcraft forward flight and/or a transition from hovering to forward flight. The flow regulator 130 of FIG. 6C, for example, may direct some of the system air into the downstream section 138 of the air flowpath 120 and some of the system air into the system vent 128. With this arrangement, the lateral thrust generated associated with the system air exhausted from the slots 150 and/or the tail thruster 124 may be selectively tuned; e.g., reduced, throttled, etc.

In some embodiments, referring to FIG. 3, the air mover 126 may be powered by the rotorcraft powerplant 80 and its heat engine 90. The fan rotor 160 of FIG. 3, for example, is operatively coupled to the heat engine 90 through a fan shaft 170 and/or another drivetrain element. The coupling between the fan rotor 160 and the rotorcraft powerplant 80 and its heat engine 90 may be a fixed ratio coupling; e.g., a 1:1 coupling, a 2:1 coupling, a 1:2 coupling, etc. depending on rotorcraft powerplant operation and/or fan rotor design. Alternatively, the coupling between the fan rotor 160 and the rotorcraft powerplant 80 and its heat engine 90 may be a variable ratio coupling; e.g., where a variable speed transmission is disposed operatively between the fan rotor 160 and the rotorcraft powerplant 80. Moreover, while the fan rotor 160 is described as being coupled to the heat engine 90, it is contemplated the fan rotor 160 may alternatively be coupled to an output from the transmission 96, the turbocompressor rotating assembly 112, or an additional power turbine rotor disposed along the powerplant flowpath 98.

Figure 8:
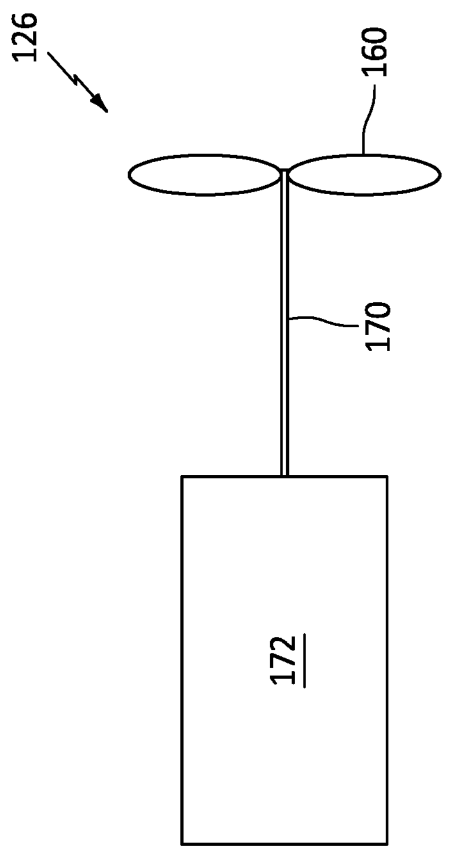
FIG. 8 is a schematic illustration of an air mover coupled to an electric motor.

In some embodiments, referring to FIG. 8, the air mover 126 may alternatively be powered by another device such as an electric motor 172. The fan rotor 160 of FIG. 8, for example, is operatively coupled to the electric motor 172 through the fan shaft 170. By utilizing the electric motor 172, a rotational velocity of the fan rotor 160 may be tuned based on rotorcraft operating requirements. For example, the rotational velocity of the fan rotor 160 may be increased and/or decreased based on operational cooling requirements for the heat engine 90 and/or whether the rotorcraft 20 is hovering or in forward flight. Moreover, the electric motor 172 may be turned for at least one or more modes of rotorcraft hovering and turned off (e.g., depowered) for at least one or more modes of rotorcraft forward flight where, for example, the cooling requirements for the heat engine 90 are otherwise met during the rotorcraft forward flight. Note, where the electric motor 172 is turned off for rotorcraft forward flight, it is contemplated the flow regulator 130 and the system vent 128 may be omitted from the air system 28. Note also, while the above functionality is described above with respect to the electric motor 172, it is also contemplated a variable transmission and/or a clutch may be utilized to also tune fan rotor rotational velocity and/or turn on/turn off fan rotor rotation.

Figure 9B:
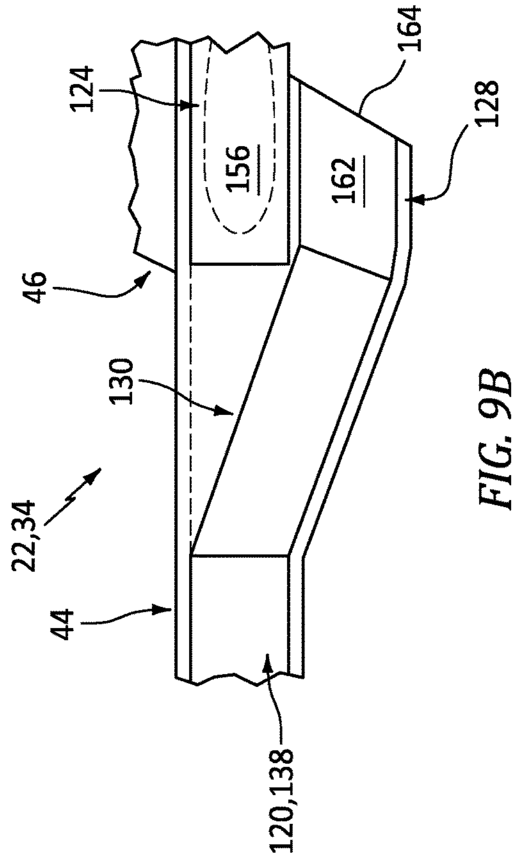
FIGS. 9A-C are partial schematic illustrations of the flow regulator between the air flowpath, a tail thruster and the system vent in various flow arrangements within the tail structure.
Figure 9A:
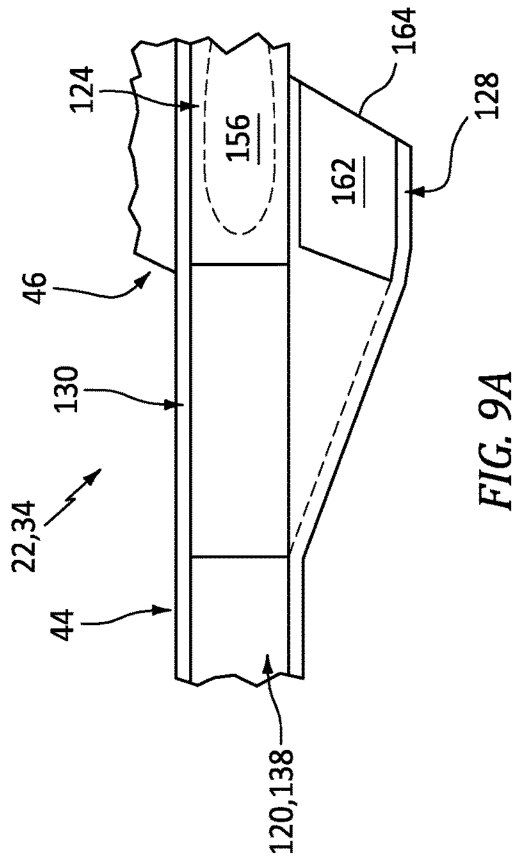
Figure 9C:
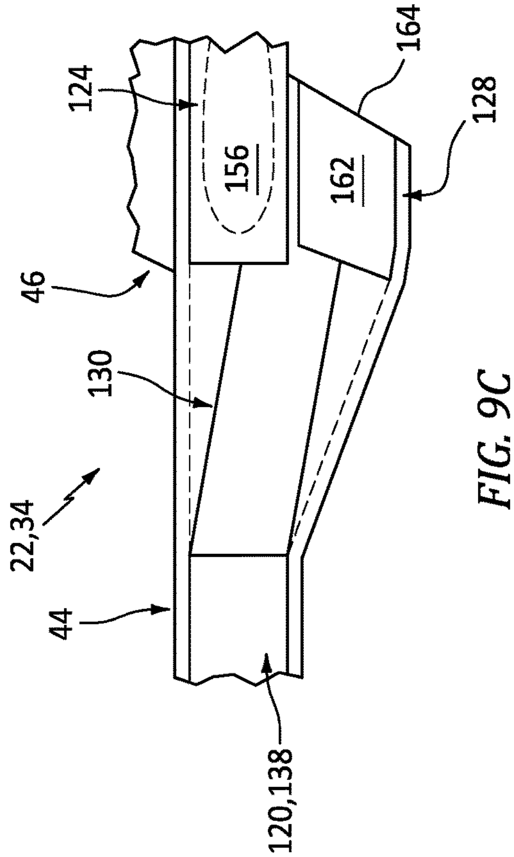

In some embodiments, referring to FIG. 3, the flow regulator 130 may be arranged upstream of the downstream section 138 of the air flowpath 120 and disposed within the fuselage 32. In other embodiments, referring to FIGS. 9A-C, the flow regulator 130 may alternatively be arranged downstream of (or along) the downstream section 138 of the air flowpath 120 and disposed within the tail structure 34. The flow regulator 130 of FIGS. 9A-C, for example, is disposed in the tail boom 44 towards the tail end. This flow regulator 130 is configured to control air flow from the downstream section 138 of the air flowpath 120 selectively to (a) the tail thruster 124 and its thruster flowpath 156 and/or (b) the system vent 128 and its vent flowpath 162. Here, the system vent 128 is also disposed with the tail structure 34 and, more particularly, the tail boom 44. With this arrangement, the slots 150 (see FIG. 4) may continue to facilitate a throttled (e.g., reduced) anti-rotation even where the system air is completely or partially diverted away from the tail thruster 124 and into the system vent 128 (see FIGS. 9B and 9C).

The rotorcraft powerplant 80 is described above with the heat engine 90. It is contemplated, however, the heat engine 90 may be paired with one or more electric machines (e.g., electric motor-generators, electric motors, etc.) to provide a hybrid powerplant for the aircraft. It is also contemplated the heat engine 90 may be replaced by an electric motor to provide an electric drive unit for the rotorcraft rotor 78, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a rotorcraft, comprising:

a fuselage;

a tail structure comprising a tail boom, the tail boom projecting longitudinally along a centerline out from the fuselage to a distal end;

an air system comprising an air flowpath, a system vent and a flow regulator, the air flowpath comprising an inlet that is formed in the fuselage and is exposed to an external environment, the system vent fluidly coupled to the environment external to the fuselage, the flow regulator disposed in the fuselage, the air flowpath including an upstream section and a downstream section, and the air flowpath passing from the inlet out of the fuselage into the tail boom and extending longitudinally within the tail boom towards the distal end;

a plurality of tail rotors connected to the tail structure at the distal end; and a plurality of electric motors, each of the plurality of electric motors operatively coupled to a respective one of the plurality of tail rotors;

wherein the flow regulator configured to direct air from the upstream section into the downstream section, while bypassing the system vent, during a first mode; and the system vent, while bypassing the downstream section, during a second mode.

2. The assembly of claim 1, wherein each of the plurality of tail rotors is configured as a ducted tail rotor.

3. The assembly of claim 1, wherein each of the plurality of tail rotors is configured as an open tail rotor.

4. The assembly of claim 1, wherein the tail structure further comprises a stabilizer connected to the tail boom at the distal end; and the plurality of tail rotors are connected to the stabilizer.

5. The assembly of claim 4, wherein the stabilizer is a vertical stabilizer; and each of the plurality of tail rotors is disposed in a respective duct extending laterally through the vertical stabilizer.

6. The assembly of claim 1, wherein the tail structure further comprises a tail rudder located longitudinally aft of the plurality of tail rotors.

7. The assembly of claim 1, wherein the air system is configured as an anti-torque system for the rotorcraft.

8. The assembly of claim 1, wherein the tail boom includes a sidewall extending longitudinally along the centerline and circumferentially about the air flowpath; and a slot extending longitudinally in the sidewall, the slot projecting through the sidewall to fluidly couple the air flowpath to the environment external to the tail structure.

9. The assembly of claim 1, wherein the tail structure further comprises a thruster; and the thruster is configured to direct air received from the air flowpath laterally out of the tail structure into the environment external to the tail structure.

10. The assembly of claim 9, wherein the thruster is a fixed thruster.

11. The assembly of claim 1, wherein the flow regulator is further configured to direct the air from the air flowpath into the thruster and the system vent during a third mode.

12. The assembly of claim 1, wherein the flow regulator is further configured to direct the air from the upstream section into the downstream section and the system vent during a third mode.

13. The assembly of claim 1, wherein the air system further comprises an air mover configured to direct air within the air flowpath towards the tail structure.

* * * * *